United States Patent
Ramesh

(10) Patent No.: US 7,342,077 B2
(45) Date of Patent: Mar. 11, 2008

(54) ACRYLIC COMPOSITION AND A METHOD OF FORMING THE SAME VIA FREE-RADICAL POLYMERIZATION

(75) Inventor: Swaminathan Ramesh, Canton, MI (US)

(73) Assignee: BASF Corporation, Southfield, MI (US)

( * ) Notice: Subject to any disclaimer, the term of this patent is extended or adjusted under 35 U.S.C. 154(b) by 540 days.

(21) Appl. No.: 10/861,061

(22) Filed: Jun. 4, 2004

(65) Prior Publication Data

US 2005/0272884 A1 Dec. 8, 2005

(51) Int. Cl.
*C08G 12/40* (2006.01)
*C08G 12/42* (2006.01)
*C08G 12/44* (2006.01)
*C08G 59/14* (2006.01)
*C08G 59/16* (2006.01)

(52) U.S. Cl. ............... 525/518; 525/452; 525/531; 528/75; 528/350; 528/363; 528/365; 528/370; 528/422

(58) Field of Classification Search ............... None
See application file for complete search history.

(56) References Cited

U.S. PATENT DOCUMENTS

| 3,390,206 | A | 6/1968 | Thompson et al. |
| 6,462,144 | B1 | 10/2002 | Ramesh et al. ............... 525/438 |
| 7,144,966 | B2 * | 12/2006 | Ramesh ............... 526/319 |
| 7,250,480 | B2 * | 7/2007 | Ramesh et al. ............... 526/319 |

FOREIGN PATENT DOCUMENTS

| GB | 2151637 | 7/1985 |
| JP | 60110702 | 6/1985 |
| JP | 2000-154204 A * | 6/2000 |
| WO | WO96/30421 | 3/1996 |
| WO | WO 00/12566 | 9/2000 |
| WO | WO 00/12567 | 9/2000 |
| WO | WO2004/069887 A2 | 8/2004 |

OTHER PUBLICATIONS

John F. Quinn, et al., Australian Publication entitled "Facile Synthesis of Comb, Star and Graft Polymers Via Reversible Addition—Fragmentation Chain Transfer (RAFT) Polymerization" May 1, 2002, pp. 2956-2966.

Craig J. Hawker, et al., Macromolecules Publication entitled << Accurate Control of Chain Ends by a Novel 'Living' Free-Radical Polymerization Process, Nov. 1, 1994, pp. 2993-2995.

European Search Report for EP1602681, dated Sep. 1, 2005, 5 pages.

English language abstract for JP60110702 extracted from espacenet.com Apr. 12, 2007.

* cited by examiner

*Primary Examiner*—Robert Sellers

(57) ABSTRACT

An acrylic composition, or star acrylic polymer, includes the reaction product of an initiator, a first compound, and a highly-branched, polyfunctional core molecule. The initiator has a radical-forming portion and a functional group. The first compound, which includes a vinyl functional group, is reactive with the initiator to form a functionalized intermediate. The core molecule is reactive with the functionalized intermediate to form the acrylic composition. A method of forming the acrylic composition via free-radical polymerization includes the steps of reacting the initiator and the first compound to form the functionalized intermediate, and reacting the core molecule with the functionalized intermediate to form the acrylic composition.

26 Claims, No Drawings

ACRYLIC COMPOSITION AND A METHOD OF FORMING THE SAME VIA FREE-RADICAL POLYMERIZATION

BACKGROUND OF THE INVENTION

1. Field of the Invention

The present invention generally relates to an acrylic composition and a method of forming the acrylic composition via free-radical polymerization. More particularly, the present invention relates to an acrylic composition that can be incorporated into a coating composition and then used in various coating applications, such as an automotive coating application, to produce films that have suitable scratch, mar, and chip performance.

2. Description of the Related Art

Acrylic compositions and their use in a wide variety of coating applications are known in the art. In a coating composition, acrylic compositions, along with a suitable cross-linking agent, are designed to produce a film having good film properties, such as resistance to scratch, mar, and chip. Coating compositions that utilize acrylic compositions typically require solvents to dissolve or otherwise reduce the acrylic composition, thus rendering the acrylic composition less viscous for optimum processing and application purposes. Solvents are required primarily due to a high molecular weight and a correspondingly high viscosity for the acrylic composition.

It is known that there is a movement toward utilizing acrylic compositions that have lower molecular weights so as to reduce the overall amount of solvents, i.e., volatile organic compounds (VOCs), required in the coating composition. However, it is also known that coating compositions that utilize acrylic compositions with lower molecular weights produce films that have poorer film properties as evidenced by decreased scratch, mar, and chip performance.

Highly branched, i.e. star, compositions are being utilized more frequently because they offer higher molecular weights yet they exhibit low viscosity, as compared to the viscosity of acrylic compositions, i.e., acrylic compositions that are not highly branched. To date, these highly branched compositions have primarily been polyester-based. However, some highly branched acrylic compositions have been developed by complex methods such as Atom Transfer Radical Polymerization (ATRP) and Reversible Addition-Fragmentation Chain Transfer (RAFT) Polymerization. These methods are complex, and are therefore generally undesirable for a variety of reasons including, but not limited to, slow reaction times, poor manufacturability, use of metal or sulfur-containing compounds, and a requirement for post purification of the acrylic composition.

Due to the inadequacies associated with the acrylic compositions of the prior art, especially the highly branched acrylic compositions developed by ATRP and RAFT, it is desirable to provide a new and unique acrylic composition and a relatively non-complex method to form the acrylic composition.

SUMMARY OF THE INVENTION AND ADVANTAGES

An acrylic composition, or star acrylic polymer, and a method of forming the acrylic composition via free-radical polymerization are disclosed. The acrylic composition comprises the reaction product of an initiator, a first compound, and a highly-branched, polyfunctional core molecule. The initiator has a radical-forming portion and a functional group. The first compound, which includes a vinyl functional group, is reactive with the initiator to form a functionalized intermediate. The core molecule is reactive with the functionalized intermediate to form the acrylic composition. The method includes the steps of reacting the initiator and the first compound to form the functionalized intermediate, and reacting the core molecule with the functionalized intermediate to form the acrylic composition.

A method of forming the star polymer, more specifically a star acrylic polymer having a core and a plurality of functionalized acrylate branches, is also disclosed. In this method, the functionalized acrylate branches are formed from the initiator and the first compound, and then the core is condensed with the functionalized acrylate branches. This method, as well as the method of forming the acrylic composition as generically outlined above, provides new techniques by which to form acrylic compositions which are relatively non-complex as compared to other methods for providing highly branched acrylic compositions, such as ATRP and RAFT. Furthermore, the acrylic compositions formed herein, in combination with a suitable cross-linking agent, produce films, especially clearcoat films, that have optimum scratch, mar, and chip performance.

DETAILED DESCRIPTION OF THE INVENTION

The acrylic composition of the present invention, also referred to in the art as a star acrylic polymer or a star polymer that has a core and a plurality of functionalized acrylate branches (also referred to as chains, arms, appendages, and the like), is preferably used in a coating composition, in conjunction with a suitable cross-linking agent. The coating composition may be used to produce a film for coating a substrate, such as the body panels of a vehicle and the like. The acrylic composition is formed via a free-radical polymerization method that is described additionally below.

The acrylic composition is, more specifically, the reaction product of an initiator that includes a radical-forming portion and a functional group, a first compound that has a vinyl functional group that is reactive with the initiator to form a functionalized intermediate, and a highly branched, polyfunctional core molecule that is reactive with the functionalized intermediate to form the acrylic composition. The highly-branched, polyfunctional core molecule, hereinafter simply referred to as the core molecule, functions as the core of the star acrylic polymer. The first compound and the core molecule are described additionally below.

The term "radical-forming portion" is defined as any portion of the initiator that may be dissociated in the presence of a catalyst, upon the application of heat, or through any other known method for dissociating an initiator. After dissociation of the initiator, the radical-forming portion of the initiator has a free radical. The vinyl functional group of the first compound is reactive with the radical-forming portion of the initiator. More specifically, the vinyl functional group is reactive with the free radical after dissociation of the initiator.

For descriptive purposes only, the functional group of the initiator is referred to herein as an initiator functional group. The initiator functional group is defined as any functional group that remains unreacted after the reaction between the initiator and the first compound and that is suitable for reacting with other functional groups introduced later via the core molecule. In other words, the initiator functional group is unreactive with the vinyl functional group of the first compound, but is reactive with the functional groups present on the core molecule. As will become evident below, the functional groups from the core molecule can vary. For example, the initiator functional group may include a carboxylic acid functional group if the core molecule includes an epoxy functional group, or the initiator functional group may include a hydroxyl functional group if the core molecule includes a hydroxyl-reactive functional group, such as an isocyanate functional group. In any event, the initiator is preferably present in the acrylic composition in an amount of from 1 to 20, more preferably from 3 to 10, parts by weight based on 100 parts by weight of the acrylic composition.

In one embodiment of the present invention, the radical-forming portion of the initiator includes an azonitrile. The initiator is capable of dissociating to form two radicalized compounds that each have the free radical. In this particular embodiment, the initiator functional group preferably includes the carboxylic acid functional group. As previously stated, the carboxylic acid functional group can react with a core molecule that includes an epoxy functional group. One such preferred initiator is commercially available as Vazo® 68 from DuPont. Vazo® 68, also known as 4,4'-azobis(4-cyano)pentanoic acid, is of the formula:

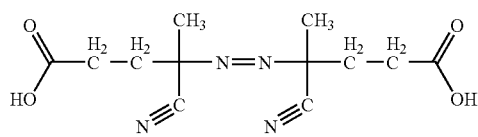

Dissociation of the 4,4'-azobis(4-cyano)pentanoic acid results in the production of nitrogen gas and two radicalized compounds that each have the free radical where the nitrogen atoms were originally bonded prior to dissociation, as shown by the following formula:

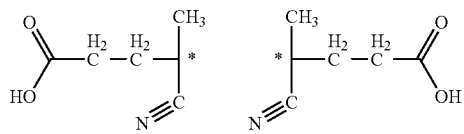

where "*" indicates the free radical.

In another embodiment, the radical-forming portion of the initiator includes a peroxide and the initiator functional group is a hydroxyl functional group. The hydroxyl functional group can react with the core molecule that includes the hydroxyl-reactive functional group. One such preferred initiator is Cyclonox® E, which is commercially available from Akzo-Nobel. Cyclonox® E is di-(1-hydroxycyclohexyl) peroxide, which is of the formula:

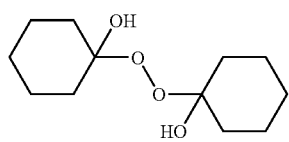

Dissociation of the di-(1-hydroxycyclohexyl) peroxide results in the oxygen-oxygen bond breaking, leaving two radicalized compounds that each have the free radical on the oxygen atom that was part of the oxygen-oxygen bond prior to dissociation, as shown by the following formula:

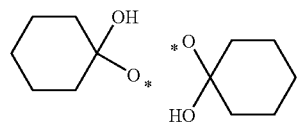

where "*" indicates the free radical.

Other initiators are suitable for the acrylic composition so long as the initiators are functionalized for subsequent reaction with the core molecule and have the ability to dissociate for initiating the free-radical polymerization with the first compound. Examples of other such initiators include, but are not limited to, initiators with an initiator functional group selected from the group of carboxylic acid halide functional groups, cyano functional groups, amido functional groups, isocyanato functional groups, amino functional groups, epoxy functional groups, and combinations thereof. As previously stated, the initiator functional group must be reactive with the functional group from the core molecule. As one, non-limiting example, instead of the initiator functional group being a carboxylic acid functional group or a hydroxyl functional group, it could be an epoxy functional group. The epoxy functional group is reactive with a core molecule that has a carboxylic acid functional group.

The first compound reacts with the initiator to form a functionalized intermediate. In addition to the vinyl functional group, the first compound preferably has a second functional group that is different from both the vinyl functional group and from the initiator functional group. More specifically, as stated above, it is the vinyl functional group of the first compound that reacts with the initiator. The second functional group is present for enabling cross-linking with a separate cross-linking agent present in the final coating composition, such as melamine, isocyanates, and the like.

If included, the second functional group of the first compound is non-reactive with the initiator and non-reactive with the core molecule. That is, the second functional group of the first compound is unreactive with the initiator, especially not with the initiator functional group, and is unreactive with the core molecule. Furthermore, it is also preferred that the second functional group of the first compound is selected from the group of cyano functional groups and epoxy functional groups. However, other second functional groups are suitable so long as the second functional groups do not react with either the core molecule or the initiator functional group. For instance, the second functional group of the first compound could be selected from the group of hydroxyl functional groups, carboxylic acid functional groups, carboxylic acid halide functional groups, amido functional groups, isocyanato functional groups, amino functional groups, and combinations thereof, depending on the initiator functional group and the core molecule that is used.

Preferably, the first compound is selected from the group of styrenes, alkyl acrylates, alkyl alkacrylates, and combinations thereof. It is to be understood that alkyl alkacrylates include, for example, alkyl methacrylates. In the preferred embodiment, the first compound also has the second functional group and is selected from the group of acrylates having an epoxy functional group in the alkyl chain, methacrylates having an epoxy functional group in the alkyl chain, and combinations thereof. More preferably, the first compound is selected from the group of glycidyl acrylate, glycidyl methacrylate, carbonates, carbamates, nitriles, and combinations thereof, especially when the initiator functional group is a hydroxyl functional group. For descriptive purposes, a chemical representation of glycidyl methacrylate, the most preferred first compound when the initiator functional group is the hydroxyl functional group, is disclosed below.

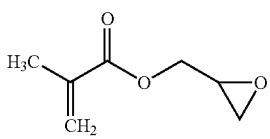

The criteria for selecting the first compound is to select a compound that will polymerize with the initiator and that has the second functional group that does not react with the initiator functional group or the functional group of the core molecule under target reaction conditions. Thus, it is apparent that compounds other than glycidyl acrylate and glycidyl methacrylate may be suitable as the first compound so long as these other compounds satisfy the criteria outlined above. Thus, the first compound may be any acrylate or methacrylate that includes functional groups such as carboxylic acid functional groups, carboxylic acid halide functional groups, cyano functional groups, amido functional groups, hydroxyl functional groups, isocyanato functional groups, amino functional groups, epoxy functional groups, and combinations thereof. For example, when the initiator has the carboxylic acid functional group, the first compound is preferably selected from the group of hydroxyalkyl acrylates, hydroxyalkyl alkacrylates, hydroxy phenyl acrylates, carbonates, carbamates, nitriles, and combinations thereof such that the first compounds are unreactive with the carboxylic acid functional group and have a second functional group, such as the hydroxyl functional group, for enabling cross-linking with the separate cross-linking agent. It is to be understood that hydroxyalkyl alkacrylates include, for example, hydroxyalkyl methacrylates. For descriptive purposes, a chemical representation of hydroxyethyl methacrylate, the most preferred first compound when the initiator functional group is the carboxylic acid functional group, is disclosed below.

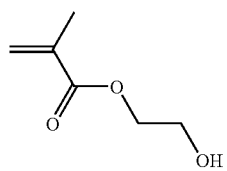

Besides the first compound which has a functional group useful for future cross-linking, the resin component may further include supplemental vinylic compounds such as acrylates, methacrylates, styrenes, etc. which may be functionalized or non-functionalized. More specifically, the supplemental vinylic compounds may be functionalized so long as the supplemental vinylic compounds are unreactive with the initiator, the first compound, or the core molecule. The supplemental vinylic compounds may be included to modify a glass transition temperature $T_g$ of a final coating composition, i.e., a reaction product of a final acrylic composition and a cross-linking agent. The final acrylic composition is the acrylic composition after reaction of the functionalized intermediate with the core molecule. In addition, the supplemental vinylic compounds may also function to modify the equivalent weight and, therefore, the cross-linking density in the final coating composition.

In the preferred embodiment, the first compound, and optionally the supplemental vinylic compounds, is present in a total amount of from 10 to 99, more preferably from 15 to 90, parts by weight based on 100 parts by weight of the acrylic composition.

For the final acrylic composition that would have a molecular weight, $M_w$, of 700 to 48,000, the functionalized intermediate disclosed below (which is also the functionalized acrylate branch) preferably has a molecular weight, $M_w$, itself of approximately 300 to 12,000, more preferably from 1,000 to 4,000. Of course, higher molecular weights, $M_w$, are possible for the functionalized intermediate, but such functionalized intermediates are not ideal for coating applications due to an excessive resultant viscosity in the final acrylic composition.

As stated above, the first compound reacts with the initiator to form the functionalized intermediate. Assuming the initiator is di-(1-hydroxycyclohexyl) peroxide and the first compound is glycidyl methacrylate, the functionalized intermediate is formed, where m ranges from 1 to 80, most preferably from 15 to 30. The functionalized intermediate is disclosed below.

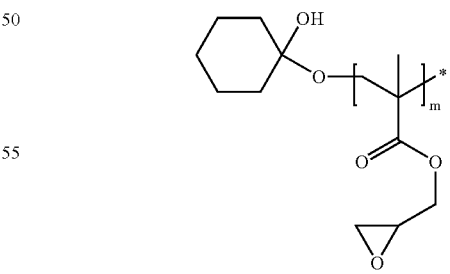

where "*" indicates the free radical. The functionalized intermediate may be terminated, at the free radical, through a number of termination reactions such as through proton extraction from a solvent, reaction with another radicalized compound, decomposition to form a double bond at the free radical site, or any combination of those reactions. The functionalized intermediate disclosed above is equivalent to the functionalized acrylate branches of the star acrylic polymer. That is, this functionalized intermediate functions as the branches for subsequent connection, via condensation, to the core of the star acrylic polymer. The functionalized acrylate branches are formed first and the core, i.e., the core molecule, is then condensed with the functionalized acrylate branches.

It is to be understood that the above functionalized intermediate is merely one example of many different functionalized intermediates that can be formed during the reaction to form the acrylic composition, and the subject invention is not necessarily limited to this particular functionalized intermediate and subsequent derivatives thereof. For example, another preferred functionalized intermediate, shown below, is formed when the initiator is 4,4'-azobis(4-cyano)pentanoic acid and the first compound is 2-hydroxyethyl methacrylate (HEMA).

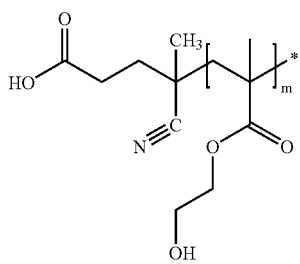

where "*" indicates the free radical. Again, the functionalized intermediate is terminated through any of the termination reactions described above. As mentioned before, the supplemental vinylic compounds (not shown) may also be present in the resin component.

Once the functionalized intermediate is formed, the core molecule is introduced to react with the functionalized intermediate to form the acrylic composition of the present invention. The core molecule is selected to provide a functional group that is reactive with the initiator functional group. As described above, the core molecule is highly branched and is polyfunctional, i.e., has a functionality greater than or equal to 2. For the purposes of this invention, the terminology highly branched indicates a core molecule that starts with a core and branches in at least two, preferably at least three and more, directions. Although extensive branching is not required, it is most preferred that the core molecule, preferably an isocyanate or epoxide, is highly branched to achieve desired viscosity benefits.

The core molecules may also be described as branched compounds that have a plurality of functional groups. The functional groups can be primary, secondary, and tertiary functional groups. The amount of the core molecule present in the reaction must be balanced with the amount of the functionalized intermediate, i.e., functionalized acrylate branches, that is formed via the reaction of the initiator and the first compound. To this end, it is preferred that the molar ratio of the core molecule, preferably the isocyanate or epoxide, to the functionalized intermediate is from 1:20 to 1:1, more preferably from 1:10 to 1:3. The core molecule establishes a foundation for the acrylic composition, i.e., the star acrylic polymer, which preferably has a highly branched organic structure.

Preferably, the core molecule is present in an amount of from 0.1 to 20, more preferably from 0.5 to 10, and most preferably from 0.5 to 1.5, parts by weight based on 100 parts by weight of the acrylic composition.

The core molecule may be selected from the group of epoxides, isocyanates, isocyanurates, melamines, polyols, polyamines, polycarboxylic acids, polycarboxylic acid halides and combinations thereof, so long as the core molecule reacts with the functionalized intermediate to form the acrylic composition. The core molecule may also be a melamine: formaldehyde resin. Preferred core molecules include isocyanates, melamines, carboxylic acid halides, and combinations thereof that react with the functionalized intermediate that has the hydroxyl functional group to form the acrylic composition. For functionalized intermediates that have the carboxylic acid functional group, preferred core molecules include epoxides that react with the functionalized intermediate to form the acrylic composition. However, other potential core molecules could be different than those mentioned above and could provide a functional group such as a hydroxyl functional group and/or an amino functional group. In such cases, the preferred initiator functional group would then include a carboxylic acid halide functional group, an isocyanato functional group, or some other functional group that is reactive with the hydroxyl functional group and/or the amino functional group. For example, polyamines provide the amino functional groups. More specifically, polyamines with a centralized core could function as the core molecule and would react with the initiator functional group, which could be the isocyanate functional group, to form urea linkages. Polyols provide the hydroxyl functional groups and also react with the functionalized intermediate that has the isocyanate functional group.

Most preferred core molecules for reacting with the functionalized intermediate that has the hydroxyl functional group, i.e. wherein the initiator is the peroxide, include isocyanates. Preferably, the isocyanates are selected from the group of trimethylol propane carbamate with tolylene diisocyanate, pentaerythritol carbamate with tolylene diisocyanate. Other preferred isocyanates include Desmodur® or Mondur® polyisocyanate commercially available from Mobay Corporation of Pittsburgh, Pa. Most preferred core molecules for reacting with the functionalized intermediate that has the carboxylic acid functional group, i.e., wherein the initiator is the 4,4'-azobis(4-cyano)pentanoic acid, include epoxides selected from the group of polyepoxides such as, for example, triglycidylisocyanurate (TGIC), trimethylolpropane triglycidyl ether, pentaerythritol tetraglycidyl ether, bisphenol-A compounds, and combinations thereof.

In the most preferred embodiment, wherein the functionalized intermediate has the carboxylic acid functional group, the core molecule is pentaerytiritol tetraglycidyl ether, which is disclosed below.

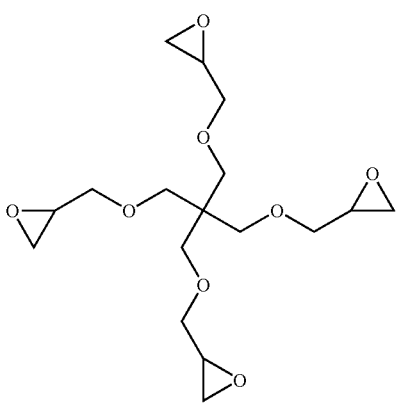

In an alternative embodiment of the subject invention wherein the functionalized intermediate has the hydroxyl functional group, the core molecule is preferably pentaerythritol carbamate with tolylene diisocyanate. For descriptive purposes, a chemical representation of pentaerythritol carbamate with tolylene diisocyanate is disclosed below.

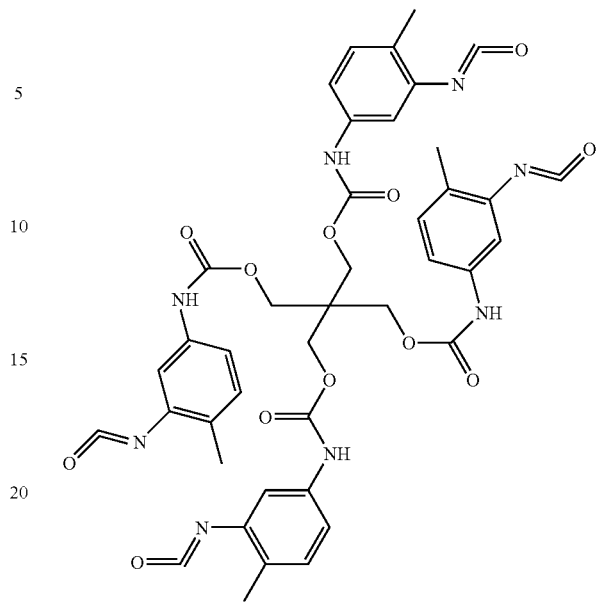

When the core molecule is present with the functionalized intermediate, the complete acrylic composition can now be formed. The core molecule is condensed with the functionalized intermediate, i.e., with the functionalized acrylate branches. More specifically, the core molecule is reacted with the functionalized intermediate to form the star acrylic polymer. Success of this method depends on the observation that when a functional initiator is used to polymerize vinylic monomers, each one of the polymer strands formed will have one and only one functional group originating from the initiator in most cases.

Assuming that the initiator is 4,4'-azobis(4-cyano)pentanoic acid, that the first compound is HEMA, and that the core molecule is pentaerythritol tetraglycidyl ether, the complete acrylic composition of the present invention is disclosed below, where m ranges from 1 to 80, most preferably from 15 to 30.

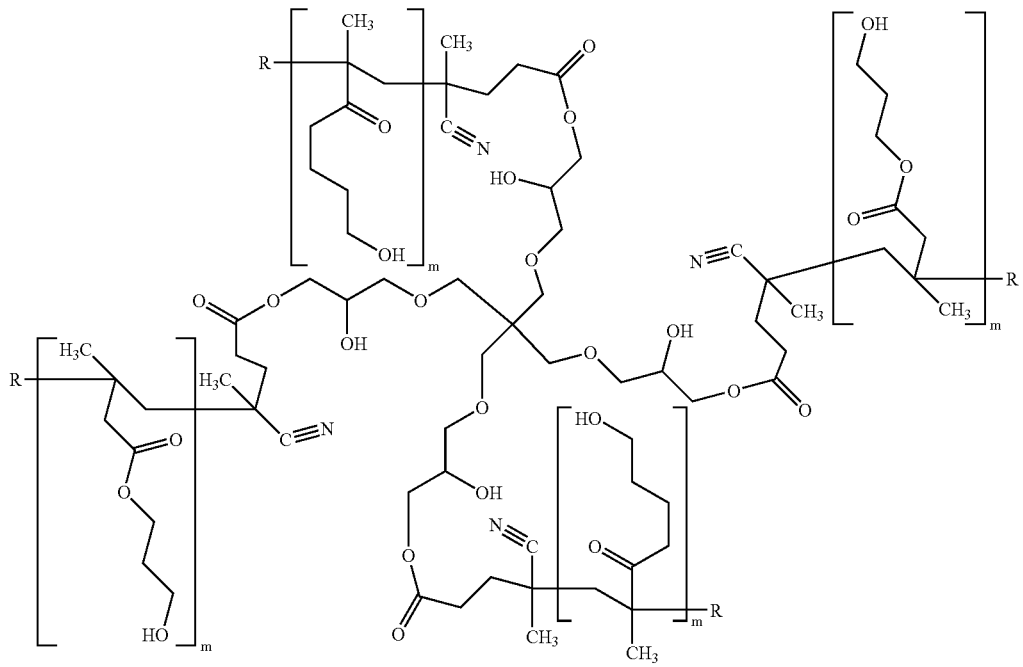

R represents the product of the termination reaction for the functionalized intermediate, the specific reactions of which were previously set forth. In this embodiment, the star acrylic polymer is the reaction product of the initiator and the first compound, and the first compound includes a vinyl functional group and the hydroxyl functional group. It is clear that the core molecule, i.e., the core, of the star acrylic polymer originally provides four epoxy groups for reaction with the functionalized acrylate branches. As a result, it is most desirable that there is four times the amount of functionalized acrylate branches present for every equivalent of the core molecule, which is preferably a four-functional epoxide.

In an alternative embodiment, wherein the initiator is di-(1-hydroxycyclohexyl) peroxide, the first compound is glycidyl methacrylate, and the core molecule is pentaerythritol carbamate with tolylene diisocyanate, the complete acrylic composition of the present invention is disclosed below, where m ranges from 1 to 80, most preferably from 15 to 30.

R represents the product of the termination reaction for the functionalized intermediate, the specific reactions of which were previously set forth. In this embodiment, the star acrylic polymer is the reaction product of the initiator and the first compound, and the first compound includes a vinyl functional group and the epoxy functional group. It is clear that the core molecule, i.e., the core, of the star acrylic polymer originally provides four isocyano groups for reaction with the functionalized acrylate branches. As a result, it is most desirable that there is four times the amount of functionalized acrylate branches present for every equivalent of the core molecule, which is preferably a four-functional isocyanate.

The acrylic compositions formed herein preferably have a molecular weight, $M_w$, of 700 to 48,000, more preferably of 1,000 to 20,000, and most preferably from 4,000 to 16,000. The steps associated with the acrylic polymerization method presented herein are conducted at a temperature of from 50° C. to 200° C., more preferably from 100° C. to 160° C.

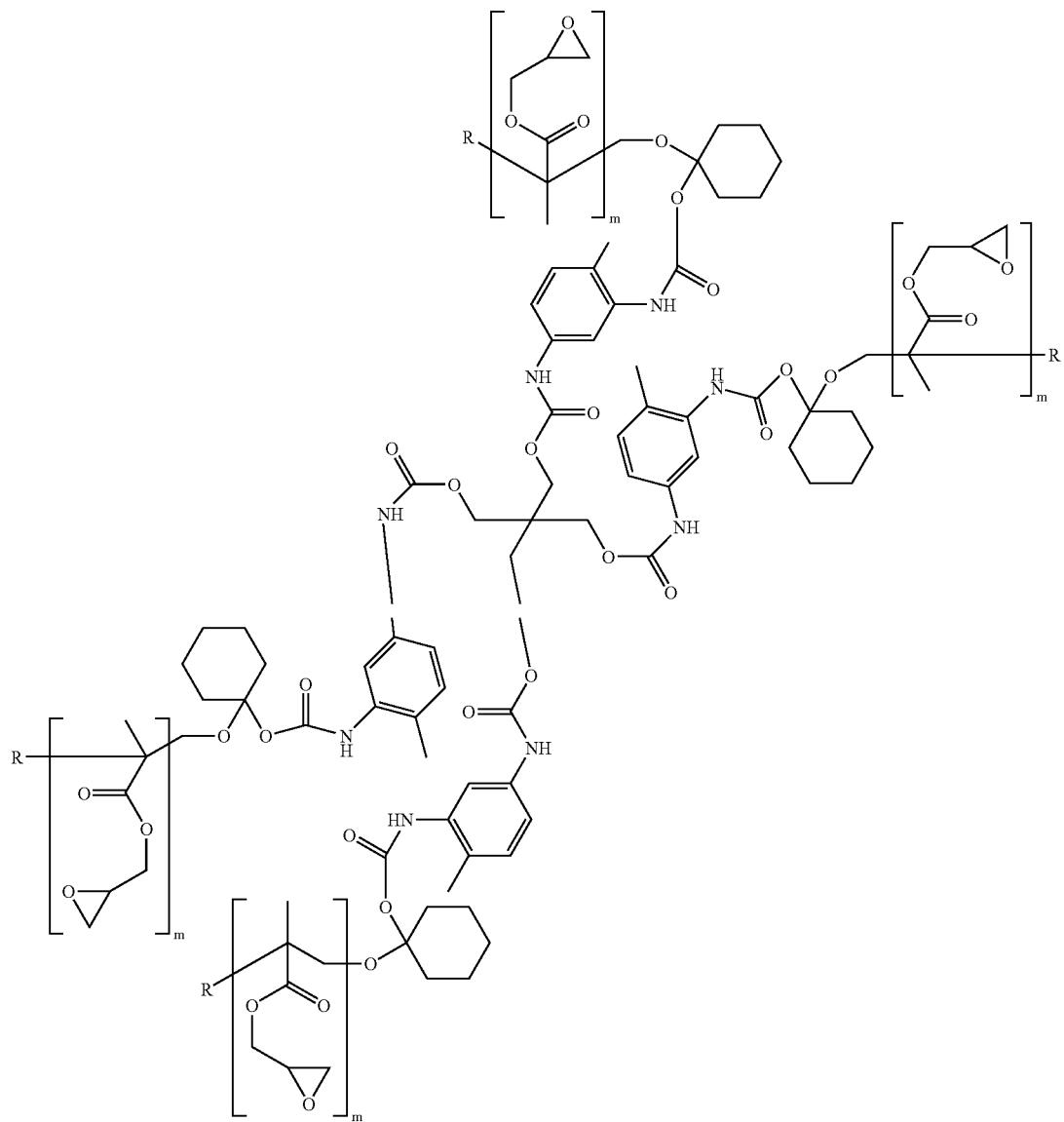

It is to be understood that all of the preceding chemical representations are merely two-dimensional chemical representations and that the structure of these chemical representations may be other than as indicated.

The following examples illustrating the formation of the acrylic composition of the subject invention, as presented herein, are intended to illustrate and not limit the subject invention.

EXAMPLES

The acrylic composition was formed by adding and reacting the following parts by weight, unless otherwise indicated.

TABLE 1

| Acrylic Composition Component | Ex. 1 | Ex. 2 |
|---|---|---|
| Initiator A | 4.83 | 0.00 |
| Initiator B | 0.00 | 9.17 |
| First Compound A | 38.61 | 0.00 |
| First Compound B | 0.00 | 27.51 |
| Supplemental Vinylic Compound A | 28.96 | 0.00 |
| Supplemental Vinylic Compound B | 24.13 | 0.00 |
| Supplemental Vinylic Compound C | 0.00 | 18.34 |
| Supplemental Vinylic Compound D | 0.00 | 36.68 |
| Core Molecule A | 3.47 | 0.00 |
| Core Molecule B | 0.00 | 8.30 |
| Total | 100.00 | 100.00 |

In Table 1:
Initiator A is 4,4'-azobis(4-cyano)pentanoic acid.
Initiator B is di-(1-hydroxycyclohexyl) peroxide.
First Compound A is 2-hydroxyethyl methacrylate.
First Compound B is glycidyl methacrylate.
Supplemental Vinylic Compound A is methyl methacrylate.
Supplemental Vinylic Compound B is n-butyl methacrylate.
Supplemental Vinylic Compound C is styrene.
Supplemental Vinylic Compound D is cyclohexyl methacrylate.
Core Molecule A is pentaeryrthritol tetraglycidyl ether.
Core Molecule B is pentaeryritol carbamate with tolylene diisocyanate.

To form the acrylic composition, 75.0 grams of Solvesso® 100 (also referred to as Aromatic 100) would be added into a reactor, and the reactor would be heated via a heat supply to a temperature of 150° C. Once the reactor reaches 150° C., a mixture of the Initiator and the First Compound, in the amounts shown in Table 1, would be added to the reactor over approximately 3 hours to form the functionalized intermediate, i.e., the functionalized acrylate branches.

The functionalized intermediate will have a % COOH content of 0.40 meq (theoretical 0.38 meq) on solids. The molecular weights and polydispersity of the intermediate would be measured using GPC analysis with $M_n$=2800, $M_w$=4760, and the polydispersity=1.7.

Once the functionalized intermediate is formed, the temperature will be lowered until the temperature of the functionalized intermediate reaches approximately 100-110° C. Then, 3.5 grams of the Core Molecule will be added to the reactor along with an additional 11 grams of Solvesso® 100. The temperature will be increased to 130° C. and held until the % COOH is reduced to less than 0.02 meq. The amounts of epoxy functionality of the acrylic composition will also be determined to be about zero. The acrylic composition will have a % non-volatile (NV) of 64.4 and, using GPC analysis, the molecular weights and polydispersity of the acrylic composition will be $M_n$=2370, $M_w$=5580 and the polydispersity=2.4. The fact that the acrylic composition will be star shaped can be discerned because a linear molecule would have a $M_w$=19400 [4×4760 (theoretical molecular weight of the starting acrylic with the initiator)+360 (theoretical molecular weight of the core molecule)]. The star, or branched, structure will provide a lower molecular weight, $M_w$, by GPC because the molecule will be globular instead of linear.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. An acrylic composition comprising the reaction product of:
   (A) an initiator having a radical-forming portion and a functional group;
   (B) a first compound having a vinyl functional group reactive with said initiator to form a functionalized intermediate; and
   (C) a highly branched, polyfunctional core molecule reactive with said functionalized intermediate to form said acrylic composition.

2. An acrylic composition as set forth in claim 1 wherein said first compound is reactive with said radical-forming portion of said initiator with said functional group of said initiator remaining unreacted in said functionalized intermediate.

3. An acrylic composition as set forth in claim 2 wherein said functional group of said initiator is selected from the group of carboxylic acid functional groups, carboxylic acid halide functional groups, cyano functional groups, amido functional groups, hydroxyl functional groups, isocyanato functional groups, amino functional groups, epoxy functional groups, and combinations thereof.

4. An acrylic composition as set forth in claim 3 wherein said first compound further has a second functional group.

5. An acrylic composition as set forth in claim 4 wherein said second functional group of said first compound is different from said functional group of said initiator.

6. An acrylic composition as set forth in claim 5 wherein said second functional group of said first compound is selected from the group of carboxylic acid functional groups, carboxylic acid halide functional groups, cyano functional groups, amido functional groups, hydroxyl functional groups, isocyanato functional groups, amino functional groups, epoxy functional groups, and combinations thereof.

7. An acrylic composition as set forth in claim 6 wherein said core molecule is selected from the group of epoxides, isocyanates, melamines, polyols, polyamines, polycarboxylic acids, and combinations thereof with said core molecule reactive with said functionalized intermediate to form said acrylic composition.

8. An acrylic composition as set forth in claim 4 wherein said functional group of said initiator is further defined as a carboxylic acid functional group.

9. An acrylic composition as set forth in claim 8 wherein said initiator is further defined as 4,4'-azobis(4-cyano)pentanoic acid.

10. An acrylic composition as set forth in claim 8 wherein said first compound is selected from the group of hydroxyalkyl acrylates, hydroxyalkyl alkacrylates, hydroxy phenyl acrylates, carbonates, carbamates, nitriles, and combinations thereof.

11. An acrylic composition as set forth in claim 8 wherein said core molecule has an epoxy functional group that is reactive with said functionalized intermediate to form said acrylic composition.

12. An acrylic composition as set forth in claim 4 wherein said functional group of said initiator is further defined as a hydroxyl functional group.

13. An acrylic composition as set forth in claim 12 wherein said initiator is further defined as di-(1-hydroxycyclohexyl) peroxide.

14. An acrylic composition as set forth in claim 12 wherein said first compound is selected from the group of glycidyl acrylate, glycidyl alkacrylates, carbonates, carbamates, nitriles, and combinations thereof.

15. An acrylic composition as set forth in claim 12 wherein said core molecule is selected from the group of isocyanates, isocyanurates, melamines, carboxylic acid halides, and combinations thereof with said core molecule reactive with said functionalized intermediate to form said acrylic composition.

16. An acrylic composition as set forth in claim 4 wherein said functional group of said initiator is further defined as a hydroxyl-reactive functional group.

17. An acrylic composition as set forth in claim 16 wherein said initiator is selected from the group of isocyanates, melamines, carboxylic acid halides, and combinations thereof.

18. An acrylic composition as set forth in claim 16 wherein said first compound is selected from the group of glycidyl acrylate, glycidyl alkacrylates, carbonates, carbamates, nitriles, and combinations thereof.

19. An acrylic composition as set forth in claim 16 wherein said core molecule is selected from the group of polyols, polyamines, and combinations thereof with said core molecule reactive with said functionalized intermediate to form said acrylic composition.

20. An acrylic composition as set forth in claim 3 wherein said first compound is selected from the group of styrenes, alkyl acrylates, alkyl alkacrylates, and combinations thereof.

21. An acrylic composition as set forth in claim 20 wherein said core molecule is selected from the group of epoxides, isocyanates, isocyanurates, melamines, polyols, polyamines, polycarboxylic acids, polycarboxylic acid halides, and combinations thereof, with said core molecule being reactive with said functionalized intermediate to form said acrylic composition.

22. An acrylic composition as set forth in claim 1 further comprising a supplemental vinylic compound that is unreactive with said initiator, said first compound, and said highly branched, polyfunctional core molecule for modifying a glass transition temperature ($T_g$) of the acrylic composition and for modifying cross-linking density in the final acrylic composition

23. An acrylic composition as set forth in claim 1 wherein said acrylic composition has a molecular weight, $M_w$, of from 700 to 48,000.

24. An acrylic composition as set forth in claim 1 wherein said initiator is present in an amount of from 1 to 20 parts by weight based on 100 parts by weight of said acrylic composition.

25. An acrylic composition as set forth in claim 1 wherein said first compound is present in an amount of from 10 to 99 parts by weight based on 100 parts by weight of said acrylic composition.

26. An acrylic composition as set forth in claim 1 wherein said core molecule is present in an amount of from 0.1 to 20 parts by weight based on 100 parts by weight of said acrylic composition.

* * * * *